United States Patent
Koga (10) Patent No.: US 9,455,445 B2
(45) Date of Patent: Sep. 27, 2016

(54) CATHODE ACTIVE MATERIAL FOR LITHIUM SECONDARY BATTERY, LITHIUM SECONDARY BATTERY AND METHOD FOR PRODUCING CATHODE ACTIVE MATERIAL FOR LITHIUM SECONDARY BATTERY

(71) Applicant: TOYOTA JIDOSHA KABUSHIKI KAISHA, Toyota-shi, Aichi-ken (JP)

(72) Inventor: Hideyuki Koga, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/811,300

(22) Filed: Jul. 28, 2015

(65) Prior Publication Data

US 2016/0043399 A1 Feb. 11, 2016

(30) Foreign Application Priority Data

Aug. 7, 2014 (JP) ................. 2014-161553

(51) Int. Cl.
  *H01M 4/58* (2010.01)
  *H01M 10/052* (2010.01)
  *C01B 25/45* (2006.01)

(52) U.S. Cl.
  CPC ............ *H01M 4/5825* (2013.01); *C01B 25/45* (2013.01); *C01P 2002/72* (2013.01); *C01P 2006/40* (2013.01); *H01M 10/052* (2013.01)

(58) Field of Classification Search
  CPC ............ H01M 4/5825; H01M 10/052; C01P 2002/72; C01P 2006/40; C01B 25/45; C01B 25/40
  See application file for complete search history.

(56) References Cited

FOREIGN PATENT DOCUMENTS

| JP | H09-171827 A | 6/1997 |
|---|---|---|
| JP | 4292317 B2 | 7/2009 |
| WO | 9812761 A1 | 3/1998 |

*Primary Examiner* — Brittany Raymond
(74) *Attorney, Agent, or Firm* — Oliff PLC (57) ABSTRACT

The main object of the present invention is to provide a cathode active material for a lithium secondary battery with high theoretical capacity. The present invention solves the problem by providing a cathode active material for a lithium secondary battery, wherein the cathode active material comprises a crystal structure belonging to a space group C12/c1, and is represented by $(Na_{1-\alpha}Li_\alpha)_x M_{1-y} N_y (PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn).

6 Claims, 3 Drawing Sheets

CATHODE ACTIVE MATERIAL FOR LITHIUM SECONDARY BATTERY, LITHIUM SECONDARY BATTERY AND METHOD FOR PRODUCING CATHODE ACTIVE MATERIAL FOR LITHIUM SECONDARY BATTERY

TECHNICAL FIELD

The present invention relates to a cathode active material for a lithium secondary battery with high theoretical capacity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

In the field of such a lithium battery, an attempt to intend to improve the performance of the lithium battery has been conventionally made while noticing a material used for an electrode active material. For example, in Patent Literature 1, the use of olivine-type $LiFePO_4$ having a crystal structure belonging to a space group Pnma as a cathode active material of the lithium battery is disclosed. Also, in Patent Literature 2, the use of nasicon-type $Li_3V_2(PO_4)_3$ having a crystal structure belonging to a space group $P2_1/n$ as a cathode active material or an anode active material of the lithium battery is disclosed.

CITATION LIST

Patent Literature

Patent Literature 1: Japanese Patent Application Publication (JP-A) No. H09-171827
Patent Literature 2: Japanese Translation of PCT International Application (JP-A) No. 2001-500665

SUMMARY OF INVENTION

Technical Problem

The above-mentioned material disclosed in Patent Literatures 1 and 2 is expected as a material having high safety; however, theoretical capacity is 200 mAh/g or less, so that the improvement of charge and discharge capacity is limited.

The main object of the present invention is to provide a cathode active material for a lithium secondary battery with high theoretical capacity.

Solution to Problem

In order to solve the problems, through earnest studies, the inventors of the present invention have completed the present invention by finding out a new cathode active material for a lithium secondary battery having a crystal structure belonging to a space group C12/c1 as a substance with high theoretical capacity, which functions as a cathode active material.

That is to say, the present invention provides a cathode active material for a lithium secondary battery, wherein the cathode active material comprises a crystal structure belonging to a space group C12/c1, and is represented by $(Na_{1-\alpha}Li_\alpha)_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn).

According to the present invention, the cathode active material for a lithium secondary battery with high theoretical capacity may be obtained by having a crystal structure belonging to a space group C12/c1, and being represented by the predetermined compositional formula.

Also, the present invention provides a cathode active material for a lithium secondary battery, wherein the cathode active material has a peak in $2\theta=12.5\pm2°$, $23.5\pm2°$, $32.5\pm2°$, $34.0\pm2°$, $48.5\pm2°$ and $58.0\pm2°$ in XRD measurement (a CuKα ray), and is represented by $(Na_{1-\alpha}Li_\alpha)_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn).

According to the present invention, the cathode active material for a lithium secondary battery with high theoretical capacity may be obtained by having a peak in $2\theta=12.5\pm2°$, $23.5\pm2°$, $32.5\pm2°$, $34.0\pm2°$, $48.5\pm2°$ and $58.0\pm2°$ in XRD measurement (a CuKα ray) and being represented by the predetermined compositional formula.

The present invention provides a lithium secondary battery comprising a cathode active material layer, an anode active material layer, and an electrolyte layer formed between the cathode active material layer and the anode active material layer, wherein the cathode active material layer contains the cathode active material for a lithium secondary battery described above.

According to the present invention, the inclusion of the cathode active material for a lithium secondary battery described above in the cathode active material layer allows the lithium secondary battery with high theoretical capacity.

The present invention provides a method for producing a cathode active material for a lithium secondary battery comprising steps of: an Na-type precursor preparing step of preparing an Na-type precursor having an Na element, an M element (M is at least one of V and Fe) and a $PO_4$ structure, and an ion exchanging step of obtaining a cathode active material for a lithium secondary battery, in which the cathode active material comprises a crystal structure belonging to a space group C12/c1, the cathode active material for a lithium secondary battery being represented by $(Na_{1-\alpha}Li_\alpha)_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn) by ion-exchanging a Na ion of the Na-type precursor for a Li ion.

According to the present invention, the cathode active material for a lithium secondary battery with high theoretical capacity may be obtained by comprising an Na-type precursor preparing step of preparing an Na-type precursor having an Na element, an M element (M is at least one of V and Fe) and a $PO_4$ structure, and an ion exchanging step of obtaining the predetermined cathode active material for a lithium secondary battery by ion-exchanging a Na ion of the Na-type precursor for a Li ion.

In the present invention, the Na-type precursor further having an N element (N is at least one of Co, Ni and Mn) is preferably prepared in the Na-type precursor preparing step. The cathode active material for a lithium secondary battery with high theoretical capacity may be obtained.

Advantageous Effects of Invention

The present invention produces the effect such as to be capable of providing a cathode active material for a lithium secondary battery with high theoretical capacity.

DESCRIPTION OF EMBODIMENTS

A cathode active material for a lithium secondary battery, a lithium secondary battery, and a method for producing a cathode active material for a lithium secondary battery of the present invention are hereinafter described in detail.

A. Cathode Active Material for Lithium Secondary Battery

First, the cathode active material for a lithium secondary battery of the present invention is described while divided into a first aspect and a second aspect.

1. First Aspect

The cathode active material of the cathode active material for a lithium secondary battery of the aspect comprises a crystal structure belonging to a space group C12/c1, and is represented by $(Na_{1-\alpha}Li_{\alpha})_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn).

According to the aspect, the cathode active material for a lithium secondary battery with high theoretical capacity as compared with a conventional cathode active material of olivine-type and nasicon-type may be obtained by having a crystal structure belonging to a space group C12/c1, and being represented by $(Na_{1-\alpha}Li_{\alpha})_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn). For example, the case where the cathode active material for a lithium secondary battery of the present invention is $Li_3V(PO_4)_2$ allows such a high theoretical capacity as to exceed 200 mAh/g. Accordingly, in the present invention, a further improvement in charge and discharge capacity may be expected as the cathode active material. The reason why the present invention allows the cathode active material for a lithium secondary battery with high theoretical capacity is conceived to be the following fact. That is to say, it is conceived that the cathode active material for a lithium secondary battery of the present invention allows high theoretical capacity for the reason that mass or volume of transition metal and phosphoric acid structure are small and the whole capacity is large with respect to reversibly movable Li.

The cathode active material for a lithium secondary battery of the aspect is hereinafter described.

First, the cathode active material of the cathode active material for a lithium secondary battery of the aspect comprises a crystal structure belonging to a space group C12/c1. The crystal structure belonging to a space group C12/c1 may be identified by XRD measurement and neutron diffraction measurement. Specifically, the crystal structure belonging to a space group C12/c1 has a peak in $2\theta = 12.5 \pm 2°$, $23.5 \pm 2°$, $32.5 \pm 2°$, $34.0 \pm 2°$, $48.5 \pm 2°$ and $58.0 \pm 2°$ in XRD measurement (a CuKα ray). Above all, the crystal structure preferably has a peak in $2\theta = 12.5 \pm 1°$, $23.5 \pm 1°$, $32.5 \pm 1°$, $34.0 \pm 1°$, $48.5 \pm 1°$ and $58.0 \pm 1°$.

The ratio of the crystal structure to all crystal structures contained in the cathode active material of the cathode active material for a lithium secondary battery, that is, (the crystal structure belonging to a space group C12/c1)/all crystal structures is preferably 90 mol % or more, above all, preferably 95 mol % or more, particularly, preferably 98 mol % or more.

Also, the cathode active material for a lithium secondary battery of the aspect is represented by $(Na_{1-\alpha}Li_{\alpha})_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn).

First, with regard to the cathode active material for a lithium secondary battery of the aspect, α in $(Na_{1-\alpha}Li_{\alpha})_xM_{1-y}N_y(PO_4)_z$ is within a range of $0.5 \leq \alpha$, preferably within a range of $0.7 \leq \alpha$, above all, preferably within a range of $0.9 \leq \alpha$. Also, α is within a range of $\alpha \leq 1$. In particular, α is preferably $\alpha = 1$. The reason therefor is that a range of $0.5 \leq \alpha$ allows the cathode active material for a lithium secondary battery to be useful, and α closer to 1 allows the function as the cathode active material for a lithium secondary battery to be sufficiently performed and allows the cathode active material for a lithium secondary battery with high theoretical capacity.

In the aspect, "x" in $(Na_{1-\alpha}Li_{\alpha})_xM_{1-y}N_y(PO_4)_z$ is not particularly limited if "x" is within a range of $2.5 \leq x \leq 3.5$. Above all, "x" is preferably within a range of $2.7 \leq x$. Also, "x" is preferably within a range of $x \leq 3.3$. In particular, "x" is preferably $x = 3$. The reason therefor is to allow the cathode active material for a lithium secondary battery with higher theoretical capacity.

Also, M in $(Na_{1-\alpha}Li_{\alpha})_xM_{1-y}N_y(PO_4)_z$ may be at least one of V and Fe and is not particularly limited. The reason therefor is to allow the divalent change from trivalence to pentavalence to be utilized in V. Incidentally, the ionic radius of Fe is so close to the ionic radius of V and used as trivalence that the same effect as V may be expected.

In addition, N in $(Na_{1-\alpha}Li_{\alpha})_xM_{1-y}N_y(PO_4)_z$ may be at least one of Co, Ni and Mn and is not particularly limited. Above all, N is preferably at least one of Ni and Co.

Further, "y" in $(Na_{1-\alpha}Li_{\alpha})_xM_{1-y}N_y(PO_4)_z$ is properly adjusted in accordance with N to be selected, and is not particularly limited if "y" is $0 \leq y$. Also, "y" is not particularly limited if "y" is within a range of $y \leq 0.5$. For example, "y" may be $y = 0$ or $0 < y$.

Also, "z" in $(Na_{1-\alpha}Li_{\alpha})_xM_{1-y}N_y(PO_4)_z$ may be within a range of $1.5 \leq z \leq 2.5$ and is not particularly limited. Above all, "z" is preferably within a range of $1.7 \leq z$. Also, "z" is preferably within a range of $z \leq 2.3$. In particular, "z" is preferably $z = 2$. The reason therefor is to allow the cathode active material for a lithium secondary battery with higher theoretical capacity.

2. Second Aspect

The cathode active material of the cathode active material for a lithium secondary battery of the aspect has a peak in $2\theta = 12.5 \pm 2°$, $23.5 \pm 2°$, $32.5 \pm 2°$, $34.0 \pm 2°$, $48.5 \pm 2°$ and $58.0\pm2°$ in XRD measurement (a CuKα ray), and is represented by $(Na_{1-\alpha}Li_\alpha)_xM_{1-y}N_y(PO_4)_z$ ($0.5\leq\alpha\leq1$, $2.5\leq x\leq3.5$, $0\leq y\leq0.5$, $1.5\leq z\leq2.5$, M is at least one of V and Fe, and N is at least one of Co, Ni and Mn).

According to the aspect, the cathode active material for a lithium secondary battery with high theoretical capacity as compared with a conventional cathode active material of olivine-type and nasicon-type may be obtained by having a peak in $2\theta=12.5\pm2°$, $23.5\pm2°$, $32.5\pm2°$, $34.0\pm2°$, $48.5\pm2°$ and $58.0\pm2°$ in XRD measurement (a CuKα ray), and being represented by $(Na_{1-\alpha}Li_\alpha)_xM_{1-y}N_y(PO_4)_z$ ($0.5\leq\alpha\leq1$, $2.5\leq x\leq3.5$, $0\leq y\leq0.5$, $1.5\leq z\leq2.5$, M is at least one of V and Fe, and N is at least one of Co, Ni and Mn). Thus, an improvement in charge and discharge capacity may be expected as the cathode active material. The specific reason is the same as the contents described in the item of '1. First aspect'; therefore, the description herein is omitted.

The cathode active material for a lithium secondary battery of the aspect is hereinafter described.

First, the cathode active material for a lithium secondary battery of the aspect has a peak in $2\theta=12.5\pm2°$, $23.5\pm2°$, $32.5\pm2°$, $34.0\pm2°$, $48.5\pm2°$ and $58.0\pm2°$ in XRD measurement (a CuKα ray). Above all, the cathode active material preferably has a peak in $2\theta=12.5\pm1°$, $23.5\pm1°$, $32.5\pm1°$, $34.0\pm1°$, $48.5\pm1°$ and $58.0\pm1°$. Specifically, the cathode active material of the cathode active material for a lithium secondary battery having a peak in $2\theta=12.5\pm2°$, $23.5\pm2°$, $32.5\pm2°$, $34.0\pm2°$, $48.5\pm2°$ and $58.0\pm2°$ in XRD measurement (a CuKα ray) ordinarily comprises the crystal structure belonging to a space group C12/c1.

Also, the cathode active material of the cathode active material for a lithium secondary battery of the aspect is represented by $(Na_{1-\alpha}Li_\alpha)_xM_{1-y}N_y(PO_4)_z$ ($0.5\leq\alpha\leq1$, $2.5\leq x\leq3.5$, $0\leq y\leq0.5$, $1.5\leq z\leq2.5$, M is at least one of V and Fe, and N is at least one of Co, Ni and Mn). Specifically, the cathode active material is the same as the contents described in the item of '1. First aspect'; therefore, the description herein is omitted.

B. Lithium Secondary Battery

Next, a lithium secondary battery of the present invention is described. The lithium secondary battery of the present invention comprises a cathode active material layer, an anode active material layer, and an electrolyte layer formed between the cathode active material layer and the anode active material layer, wherein the cathode active material layer contains the cathode active material for a lithium secondary battery of the first aspect or the second aspect described above. The lithium secondary battery is hereinafter described while referring to FIGS.

Figure 1:
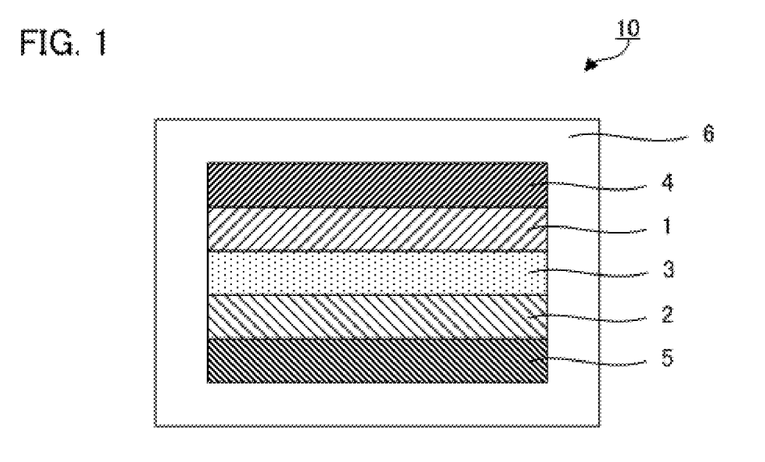
FIG. 1 is a schematic cross-sectional view showing an example of a lithium secondary battery of the present invention.

FIG. 1 is a schematic cross-sectional view showing an example of the lithium secondary battery of the present invention. A lithium secondary battery 10 shown in FIG. 1 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. With regard to the lithium secondary battery 10 in the present invention, the cathode active material layer 1 contains the cathode active material for a lithium secondary battery described above.

According to the present invention, the inclusion of the cathode active material for a lithium secondary battery of the first aspect or the second aspect described above in the cathode active material layer allows the lithium secondary battery with high theoretical capacity. Also, the lithium secondary battery of this application allows reversible charge and discharge.

The lithium battery of the present invention is hereinafter described in each constitution.

1. Cathode Active Material Layer

The cathode active material layer in the present invention is a layer containing at least the cathode active material for a lithium secondary battery, and may further contain at least one of an electrolyte material, a conductive material and a binder as required.

The content of the cathode active material for a lithium secondary battery in the cathode active material layer is not particularly limited if the content is such as to allow the effect of the present invention. The content is, for example, preferably within a range of 10% by weight to 99% by weight, above all, preferably within a range of 20% by weight to 90% by weight. Incidentally, the cathode active material for a lithium secondary battery is as described in the 'A. Cathode active material for lithium secondary battery'.

Also, the cathode active material layer preferably contains the electrolyte material. The reason therefor is to allow Li ion conductivity in the cathode active material layer to be improved. Incidentally, the electrolyte material contained in the cathode active material layer is the same as an electrolyte material described in the after-mentioned '3. Electrolyte layer'.

The cathode active material layer in the present invention may further contain the conductive material. The addition of the conductive material allows electrical conductivity of the cathode active material layer to be improved. Examples of the conductive material include a carbon material such as acetylene black, Ketjen Black and carbon fiber, and a metallic material. Also, the cathode active material layer may further contain the binder. Examples of the binder include fluorine-containing binders such as polytetrafluoroethylene (PTFE) and polyvinylidene fluoride (PVDF). Also, the thickness of the cathode active material layer varies with the constitution of an intended lithium battery, and is, for example, preferably within a range of 0.1 μm to 1000 μm.

2. Anode Active Material Layer

The anode active material layer in the present invention is a layer containing at least the anode active material, and may further contain at least one of an electrolyte material, a conductive material and a binder as required.

Examples of the anode active material include a metal active material and a carbon active material. Examples of the metal active material include Li alloy, In, Al, Si, and Sn. On the other hand, examples of the carbon active material include graphite such as mesocarbon microbeads (MCMB) and high orientation property graphite (HOPG), and amorphous carbon such as hard carbon and soft carbon. Incidentally, SiC may be also used as the anode active material.

The anode active material layer preferably contains the electrolyte material. The reason therefor is to allow Li ion conductivity in the anode active material layer to be improved. Incidentally, the electrolyte material contained in the anode active material layer is the same as an electrolyte material described in the after-mentioned '3. Electrolyte layer'.

Incidentally, the conductive material and the binder used for the anode active material layer are the same as the case in the cathode active material layer described above. Also, the thickness of the anode active material layer varies with the constitution of an intended lithium battery, and is, for example, preferably within a range of 0.1 μm to 1000 μm.

3. Electrolyte Layer

The electrolyte layer in the present invention is a layer formed between the cathode active material layer and the anode active material layer, and containing at least an electrolyte material. Ion conduction between a cathode active material and an anode active material is performed through the electrolyte contained in the electrolyte layer. The form of the electrolyte layer is not particularly limited but examples thereof include a liquid electrolyte layer, a gel electrolyte layer and a solid electrolyte layer.

The liquid electrolyte layer is ordinarily a layer obtained by using a nonaqueous liquid electrolyte. Kinds of nonaqueous liquid electrolytes vary in accordance with kinds of batteries; for example, the nonaqueous liquid electrolyte of a lithium battery ordinarily contains a lithium salt and a nonaqueous solvent. Examples of the lithium salt include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$ and $LiC(CF_3SO_2)_3$. Incidentally, the lithium salt preferably contains fluorine. Examples of the nonaqueous solvent include ethylene carbonate (EC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, and mixtures thereof. The concentration of the lithium salt in the nonaqueous liquid electrolyte is, for example, within a range of 0.5 mol/L to 3 mol/L. Incidentally, in the present invention, a low-volatile liquid such as an ionic liquid may be used as the nonaqueous liquid electrolyte.

The gel electrolyte layer may be obtained by adding and gelating a polymer to a nonaqueous liquid electrolyte. Specifically, gelation may be performed by adding polymers such as polyethylene oxide (PEO), polyacrylonitrile (PAN) or polymethyl methacrylate (PMMA) to a nonaqueous liquid electrolyte.

The solid electrolyte material is not particularly limited if the material is such as to have Li ion conductivity, but examples thereof include a sulfide solid electrolyte material and an oxide based solid electrolyte material.

Examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ ("m" and "n" are positive numbers, Z is any of Ge, Zn and Ga), $Li_2S$—$GeS_2$, $Li_2S$—$SiS_2$—$Li_3PO_4$, and $Li_2S$—$SiS_2$—$Li_xMO_y$ ("x" and "y" are positive numbers, M is any of P, Si, Ge, B, Al, Ga and In). Incidentally, the description of the "$Li_2S$—$P_2S_5$" signifies the sulfide solid electrolyte material obtained by using a raw material composition containing $Li_2S$ and $P_2S_5$, and other descriptions signify similarly.

On the other hand, examples of the oxide based solid electrolyte material include a NASICON-type oxide, a garnet-type oxide and a perovskite-type oxide. Examples of the NASICON-type oxide include an oxide containing Li, Al, Ti, P and O (such as $Li_{1.5}Al_{0.5}Ti_{1.5}(PO_4)_3$) and an oxide containing Li, Al, Ge, P and O (such as $Li_{1.5}Al_{0.5}Ge_{1.5}(PO_4)_3$). Examples of the garnet-type oxide include an oxide containing Li, La, Zr and O (such as $Li_7La_3Zr_2O_{12}$). Examples of the perovskite-type oxide include an oxide containing Li, La, Ti and O (such as $LiLaTiO_3$).

The thickness of the electrolyte layer is not particularly limited but is, for example, preferably within a range of 0.1 μm to 1000 μm, more preferably within a range of 0.1 μm to 300 μm.

4. Other Constitutions

The lithium secondary battery of the present invention comprises at least the anode active material layer, cathode active material layer and electrolyte layer described above, ordinarily further comprising a cathode current collector for collecting the cathode active material layer and an anode current collector for collecting the anode active material layer. Also, a battery case of a general lithium secondary battery may be used for a battery case used for the present invention.

5. Lithium Secondary Battery

The lithium secondary battery of the present invention is useful as a car-mounted battery, for example. Also, examples of the shape of the lithium secondary battery of the present invention include a coin shape, a laminate shape, a cylindrical shape and a rectangular shape.

C. Method for Producing Cathode Active Material for Lithium Secondary Battery Next, a method for producing a cathode active material for a lithium secondary battery of the present invention is described. The present invention comprises steps of: an Na-type precursor preparing step of preparing an Na-type precursor having an Na element, an M element (M is at least one of V and Fe) and a $PO_4$ structure, and an ion exchanging step of obtaining a cathode active material for a lithium secondary battery, in which n the cathode active material comprises a crystal structure belonging to a space group C12/c1, and being represented by $(Na_{1-\alpha}Li_\alpha)_xM_{1-y}N_y(PO_4)_z$ (0.5≤α≤1, 2.5≤x≤3.5, 0≤y≤0.5, 1.5≤z≤2.5, M is at least one of V and Fe, and N is at least one of Co, Ni and Mn) by ion-exchanging Na ions of the Na-type precursor for Li ions.

The present invention comprises the Na-type precursor preparing step of preparing an Na-type precursor having an Na element, an M element (M is at least one of V and Fe) and a $PO_4$ structure, and the ion exchanging step of obtaining a cathode active material for a lithium secondary, in which the cathode active material comprises a crystal structure belonging to a space group C12/c1, and being represented by $(Na_{1-\alpha}Li_\alpha)_xM_{1-y}N_y(PO_4)_z$ (0.5≤α≤1, 2.5≤x≤3.5, 0≤y≤0.5, 1.5≤z≤2.5, M is at least one of V and Fe, and N is at least one of Co, Ni and Mn) by ion-exchanging Na ions of the Na-type precursor for Li ions. Thus, the cathode active material for a lithium secondary battery with high theoretical capacity may be obtained. The specific reason may be the same as the contents described in the item of 'A. Cathode active material for lithium secondary battery 1. First aspect'; therefore, the description herein is omitted.

Figure 2:
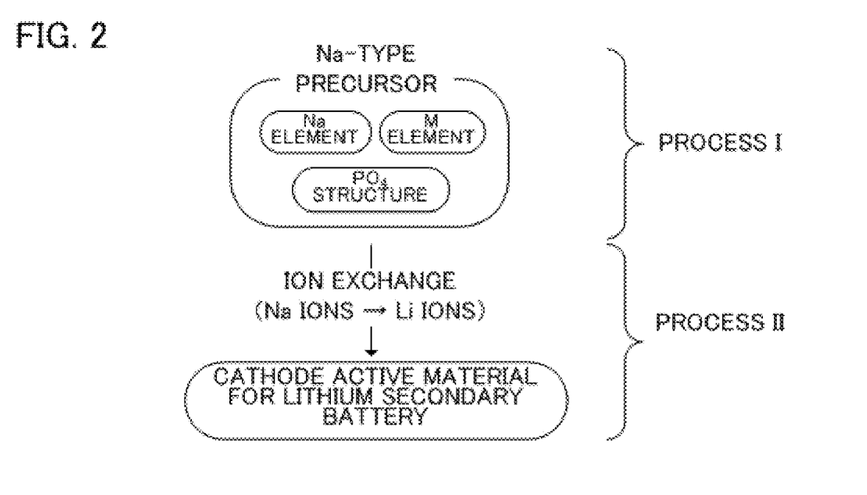
FIG. 2 is a schematic process drawing showing an example of a method for producing a cathode active material for a lithium secondary battery of the present invention.
Figure 3A:
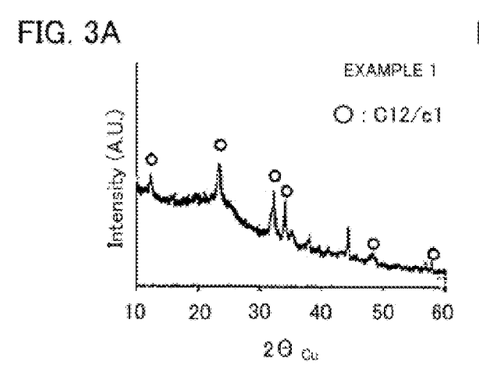
FIGS. 3A to 3E are each a graph showing XRD measurement results of a cathode active material for a lithium secondary battery each obtained in Examples 1 to 4 and Comparative Example.
Figure 3B:
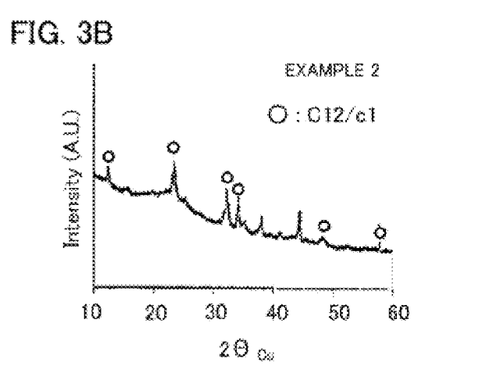
Figure 3C:
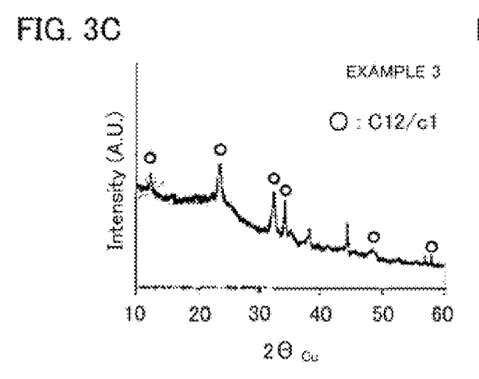
Figure 3D:
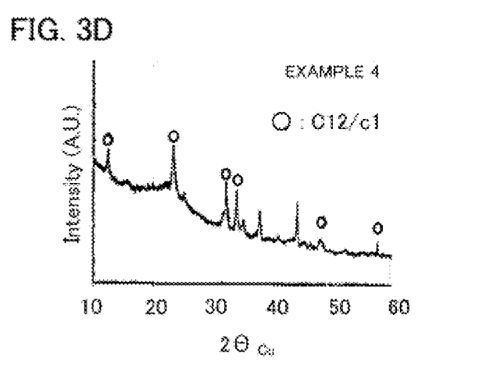
Figure 3E:
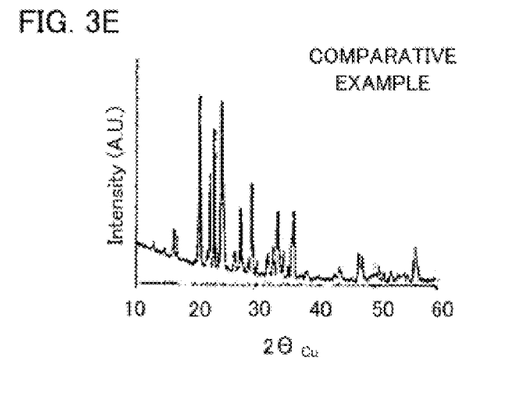
Figure 4A:
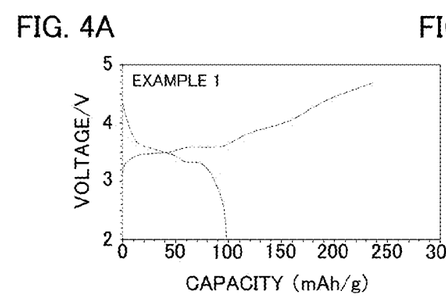
FIGS. 4A to 4E are each a graph showing charge and discharge curves of a cathode active material for a lithium secondary battery each obtained in Examples 1 to 4 and Comparative Example.
Figure 4B:
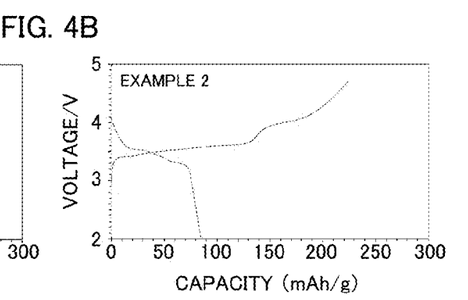
Figure 4C:
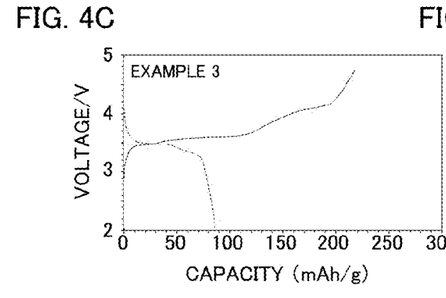
Figure 4D:
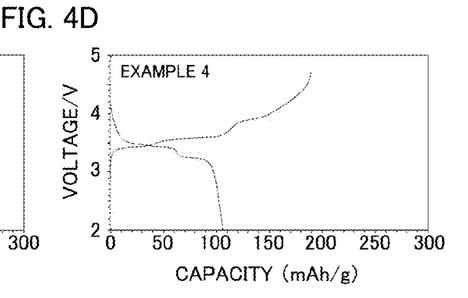
Figure 4E:
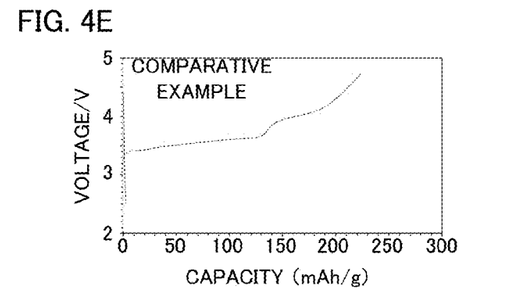

The method for producing a cathode active material for a lithium secondary battery of the present invention is described while referring to FIGS. FIG. 2 is a process drawing showing an example of the present invention. As shown in process I of FIG. 2, the present invention comprises the Na-type precursor preparing step of preparing an Na-type precursor having an Na element, an M element (M is at least one of V and Fe) and a PO structure. Next, as shown in process II of FIG. 2, the present invention comprises the ion exchanging step of obtaining a desired cathode active material for a lithium secondary battery by ion-exchanging Na ions of the Na-type precursor for Li ions.

The method for producing a cathode active material for a lithium secondary battery of the present invention is hereinafter described.

1. Na-Type Precursor Preparing Step

The Na-type precursor preparing step in the present invention is step of preparing an Na-type precursor having an Na element, an M element (M is at least one of V and Fe) and a $PO_4$ structure.

The Na-type precursor having an Na element, an M element (M is at least one of V and Fe) and a $PO_4$ structure is obtained by using an Na source, an M source (M is at least one of V and Fe) and a $PO_4$ source.

The Na source used in the step is not particularly limited if the Na source is such as to allow the desired Na-type precursor, but examples thereof include an Na salt. Specific examples of the Na salt include $Na_2CO_3$, NaCl, NaBr, NaI, NaF, $Na_2SO_4$, $NaNO_3$ and NaOH. Above all, $Na_2CO_3$ is preferably used.

The M source (M is at least one of V and Fe) used in the step is not particularly limited if the M source is such as to allow the desired Na-type precursor, but is, for example, preferably at least one of a V source and an Fe source, particularly, preferably a V source. Examples of the V source include phosphate. Specific examples of the phosphate include vanadium phosphate. Also, examples of the Fe source include an oxide containing Fe and specific examples thereof include $Fe_2O_3$.

The $PO_4$ source used in the step is not particularly limited if the $PO_4$ source is such as to allow the desired Na-type precursor, but examples thereof include phosphate. Specific examples of the phosphate include $NH_4H_2PO_4$, $(NH_4)_2HPO_4$ and $(NH_4)_3PO_4$. Above all, $NH_4H_2PO_4$ is preferably used.

The Na-type precursor may have an N element (N is at least one of Co, Ni and Mn) except an Na element, an M element (M is at least one of V and Fe) and a $PO_4$ structure. In this case, the Na-type precursor is obtained by using an Na source, an M source (M is at least one of V and Fe), a $PO_4$ source and an N source (N is at least one of Co, Ni and Mn). The N source is not particularly limited if the N source is such as to allow the desired Na-type precursor, but is, for example, preferably at least one of a Co source, an Ni source and an Mn source. Examples of the Co source include an oxide containing Co and specific examples thereof include $Co_3O_4$. Also, examples of the Ni source include an oxide containing Ni and specific examples thereof include NiO. In addition, examples of the Mn source include an oxide containing Mn and specific examples thereof include $Mn_2O_3$.

A method for synthesizing the Na-type precursor is not particularly limited if the method is such as to allow the desired Na-type precursor. For example, the Na-type precursor may be synthesized by mixing the Na source, M source and $PO_4$ source described above to burn an obtained mixture. A burning step of burning the mixture is preferably performed in an inert gas atmosphere. Examples of the inert gas include rare gases such as helium gas, neon gas and argon gas, and nitrogen gas.

Also, in the burning step, the burning temperature for burning the mixture in which the Na source, the M source and the $PO_4$ source are mixed is preferably 600° C. or more, above all, preferably 700° C. or more, particularly, preferably 800° C. or more. The case where the burning temperature is too lower than the range brings a possibility of not allowing the desired Na-type precursor for the reason that crystallization may not be performed sufficiently. On the other hand, the burning temperature for burning the mixture is preferably 1000° C. or less, above all, preferably 950° C. or less, particularly, preferably 900° C. or less. The case where the burning temperature is too higher than the range brings a possibility of not allowing the desired Na-type precursor for the reason that the crystal structure is broken.

The Na-type precursor obtained in the step ordinarily has a crystal structure belonging to a space group C12/c1. Also, the Na-type precursor is ordinarily represented by $Na_xM_{1-y}N_y(PO_4)_z$ ($2.5 \leq x \leq 3.5$, $0 \leq y \leq 0.5$, $1.5 \leq z \leq 2.5$, M is at least one of V and Fe, and N is at least one of Co, Ni and Mn). Above all, the Na-type precursor preferably has an N element (N is at least one of Co, Ni and Mn) further. The cathode active material for a lithium secondary battery with high theoretical capacity may be obtained in the ion exchanging step described later by obtaining the desired Na-type precursor.

2. Ion Exchanging Step

The ion exchanging step in the present invention is a step of obtaining a cathode active material for a lithium secondary battery, in which the cathode active material comprises a crystal structure belonging to a space group C12/c1, and being represented by $(Na_{1-\alpha}Li_\alpha)_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn) by ion-exchanging Na ions of the Na-type precursor for Li ions.

The step is not particularly limited if the step allows the desired cathode active material for a lithium secondary battery by ion-exchanging Na ions of the Na-type precursor, which is a precursor of the cathode active material for a lithium secondary battery, for Li ions. Examples thereof include a method such that the Na-type precursor obtained by the Na-type precursor preparing step is immersed in an Li salt aqueous solution and ion-exchanged to obtain the desired cathode active material for a lithium secondary battery. The Li salt aqueous solution then used is not particularly limited if the Li salt aqueous solution is a solution such as to allow Na ions of the Na-type precursor to be ion-exchanged for Li ions. Examples thereof include LiOH aqueous solution, LiCl aqueous solution and $Li_2SO_4$ aqueous solution.

The ion-exchanging method is not particularly limited if the ion-exchanging method allows the desired cathode active material for a lithium secondary battery. For example, a method for ion-exchanging by immersing in the Li salt aqueous solution and refluxing under the predetermined conditions is preferable.

3. Other Steps

With regard to the method for producing a cathode active material for a lithium secondary battery of the present invention, necessary steps except the Na-type precursor preparing step and the ion exchanging step described above may be properly selected and added.

4. Cathode Active Material for Lithium Secondary Battery

The cathode active material of the cathode active material for a lithium secondary battery obtained by the present invention comprises a crystal structure belonging to a space group C12/c1, and is represented by $(Na_{1-\alpha}Li_\alpha)_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn). The cathode active material for a lithium secondary battery obtained by the present invention has the effect of high theoretical capacity. Incidentally, specifically, the cathode active material for a lithium secondary battery may be the same as the contents described in the item of 'A. Cathode active material for lithium secondary battery 1. First aspect'; therefore, the description herein is omitted.

Also, the present invention may provide the method for producing a cathode active material for a lithium secondary battery described in the item of 'A. Cathode active material for lithium secondary battery 2. Second aspect'. That is to say, the present invention may also provide the method for producing a cathode active material for a lithium secondary battery comprising steps of: the Na-type precursor preparing step of preparing an Na-type precursor having an Na element, an M element (M is at least one of V and Fe) and a $PO_4$ structure, and the ion exchanging step of obtaining a cathode active material for a lithium secondary battery, in which the cathode active material has a peak in $2\theta = 12.5 \pm 2°$, $23.5 \pm 2°$, $32.5 \pm 2°$, $34.0 \pm 2°$, $48.5 \pm 2°$ and $58.0 \pm 2°$ in XRD measurement (a CuKα ray), and is represented by $(Na_{1-\alpha}Li_\alpha)_xM_{1-y}N_y(PO_4)_z$ ($0.5 \leq \alpha \leq 1$, $2.5 \leq x \leq 3.5$, $0 \leq y \leq 0.5$, $1.5 \leq z \leq 2.5$, M is at least one of V and Fe, and N is at least one of Co, Ni and Mn) by ion-exchanging Na ions of the Na-type precursor for Li ions. The cathode active material for a lithium secondary battery has the effect of high theoretical capacity. Incidentally, the Na-type precursor preparing step and the ion exchanging step may be the same as the contents described in the item of '1. Na-type precursor preparing step' and '2. Ion exchanging step'; therefore, the description herein is omitted. Also, the cathode active material for a lithium secondary battery obtained herein may be the same as the contents described in the item of 'A. Cathode active material for lithium secondary battery 2. Second aspect'; therefore, the description herein is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Production of Cathode Active Material for Lithium Secondary Battery

Na-Type Precursor Preparing Step $Na_2CO_3$, $VPO_4$ and $NH_4H_2PO_4$ were prepared and mixed at a ratio of $Na_2CO_3:VPO_4:NH_4H_2PO_4=1.5:1:1$ (molar ratio) to obtain a mixture. Incidentally, the molar ratio corresponds to a stoichiometric ratio for obtaining $Li_3V(PO_4)_2$. Next, the obtained mixture was burned on the conditions of Ar atmosphere, 850° C. and 100 hours. Thereafter, the mixture and carbon were mixed at a ratio of mixture:carbon=1:0.25 (wt %), and carbon-coated.

Ion Exchanging Step

The Na-type precursor obtained in the Na-type precursor preparing step was ion-exchanged for 3 days while immersed in an LiOH aqueous solution (5M) and refluxed at a temperature of 80° C.

Thus, a cathode active material for a lithium secondary battery was produced. The obtained cathode active material for a lithium secondary battery was shown in Table 1.
(Production of Working Electrode)

The obtained cathode active material for a lithium secondary battery, a conductive material and polyvinylidene fluoride (PVDF) were mixed in N-methylpyrrolidone to produce slurry. The mixing ratio (weight ratio (wt %)) of the cathode active material for a lithium secondary battery, conductive material and PVDF was determined at cathode active material for a lithium secondary battery:conductive material:PVDF=64:30:6. Next, the obtained slurry was applied on the surface of an Al foil (manufactured by Nippon Foil Mfg. Co., Ltd., a thickness of 15 μm). Thereafter, the slurry was pressed so that electrode density was 1.2 mg/cm² to thereby crimp the Al foil and the cathode active material layer, and produce a working electrode. Lastly, the obtained working electrode was stamped into a circular form (φ 16 mm) as a cylindrical column.
(Production of Evaluation Battery)

The obtained working electrode was regarded as an anode and Li metal was used as a counter electrode. Also, ethylene carbonate (EC) and diethyl carbonate (DEC) were mixed at a ratio of EC:DEC=1:1 (volume %), and 1 M-NaPF$_6$ was further mixed thereinto to obtain a liquid electrolyte. An evaluation battery of a coin type (2032 type) composed of the anode, counter electrode, liquid electrolyte described above and a separator (PE) was produced.

Example 2

An evaluation battery was produced in the same manner as Example 1 except that $Na_2CO_3$, $VPO_4$, $NH_4H_2PO_4$ and $Co_3O_4$ were prepared and mixed at a ratio of $Na_2CO_3:VPO_4:NH_4H_2PO_4:Co_3O_4=1.5:0.9:1.1:0.03$ (molar ratio) to obtain a mixture. The obtained cathode active material for a lithium secondary battery was shown in Table 1. Incidentally, the molar ratio corresponds to a stoichiometric ratio for obtaining $Li_3V_{0.9}Co_{0.1}(PO_4)_2$.

Example 3

An evaluation battery was produced in the same manner as Example 1 except that $Na_2CO_3$, $VPO_4$, $NH_4H_2PO_4$ and NiO were prepared and mixed at a ratio of $Na_2CO_3:VPO_4:NH_4H_2PO_4:NiO=1.5:0.9:1.1:0.1$ (molar ratio) to obtain a mixture. The obtained cathode active material for a lithium secondary battery was shown in Table 1. Incidentally, the molar ratio corresponds to a stoichiometric ratio for obtaining $Li_3V_{0.9}Ni_{0.1}(PO_4)_2$.

Example 4

An evaluation battery was produced in the same manner as Example 1 except that $Na_2CO_3$, $VPO_4$, $NH_4H_2PO_4$ and $Fe_2O_3$ were prepared and mixed at a ratio of $Na_2CO_3:VPO_4:NH_4H_2PO_4:Fe_2O_3=1.5:0.9:1.1:0.05$ (molar ratio) to obtain a mixture. The obtained cathode active material for a lithium secondary battery was shown in Table 1. Incidentally, the molar ratio corresponds to a stoichiometric ratio for obtaining $Li_3V_{0.9}Fe_{0.1}(PO_4)_2$.

Comparative Example

An evaluation battery was produced in the same manner as Example 1 except that $Li_2CO_3$, $VPO_4$ and $NH_4H_2PO_4$ were prepared and mixed at a ratio of $Li_2CO_3:VPO_4:NH_4H_2PO_4=1.5:1:1$ (molar ratio) to obtain a mixture, and the ion exchanging step was not performed. Incidentally, the molar ratio corresponds to a stoichiometric ratio for obtaining $Li_3V(PO_4)_2$; however, it is guessed that a cathode active material for a lithium secondary battery having the composition was not obtained.
[Evaluations 1]
(XRD Measurement)

XRD measurement was performed for the cathode active material for a lithium secondary battery each obtained in Examples 1 to 4 and Comparative Example. The results are shown in FIGS. 3A to 3E. In the XRD chart (a CuKα ray) of Examples 1 to 4 shown in FIGS. 3A to 3D, the peak of a crystal structure belonging to a space group C12/c1 was confirmed in 2θ=12.5±2°, 23.5±2°, 32.5±2°, 34.0±2°, 48.5±2° and 58.0±2°. On the other hand, in the XRD chart of Comparative Example shown in FIG. 3E, the peak of a crystal structure belonging to a space group C12/c1 was not confirmed.
[Evaluations 2]
(Evaluations of Charge and Discharge Capacity)

The evaluation battery obtained in Examples 1 to 4 and Comparative Example was charged up to 4.7 V at 0.1 C and thereafter discharged up to 2.2 V to measure charge capacity and discharge capacity at this time. The results are shown in Table 1 and FIG. 4.

TABLE 1

| | COMPOSITION OF CATHODE ACTIVE MATERIAL FOR LITHIUM SECONDARY BATTERY | PRESENCE OR ABSENCE OF C12/c1 STRUCTURE | CHARGE CAPACITY (mAh/g) | DISCHARGE CAPACITY (mAh/g) |
|---|---|---|---|---|
| EXAMPLE 1 | $Li_3V(PO_4)_2$ | PRESENT | 236 | 98 |
| EXAMPLE 2 | $Li_3V_{0.9}Co_{0.1}(PO_4)_2$ | | 224 | 85 |
| EXAMPLE 3 | $Li_3V_{0.9}Ni_{0.1}(PO_4)_2$ | | 220 | 88 |
| EXAMPLE 4 | $Li_3V_{0.9}Fe_{0.1}(PO_4)_2$ | | 190 | 108 |
| COMPARATIVE EXAMPLE | — | ABSENT | 221 | 3 |

As shown in Table 1 and FIGS. 4A to 4D, in the case of using the cathode active material for a lithium secondary battery of Examples 1 to 4, in which it was clear from the XRD measurement results that the cathode active material had a space group C12/c1 structure, it was clear that both charge capacity and discharge capacity offered so high value as to function as the cathode active material. Also, as shown in FIGS. 4A to 4D, in the case of using the cathode active material for a lithium secondary battery of Examples 1 to 4, a plateau appeared in the vicinity of 3.5 V. On the other hand, as shown in Table 1 and FIG. 4E, in the case of using the cathode active material for a lithium secondary battery of Comparative Example, which did not have a space group C12/c1 structure, it was found that discharge capacity was so low as to function as the cathode active material with difficulty. Thus, it was found that the presence or absence of a space group C12/c1 structure contributed to reversible charge and discharge.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . lithium secondary battery

What is claimed is:

1. A cathode active material for a lithium secondary battery, wherein the cathode active material comprises a crystal structure belonging to a space group C12/c1, and is represented by $(Na_{1-\alpha}Li_\alpha)_xM_{1-y}N_y(PO_4)_z$ ($0.5 \le \alpha \le 1$, $2.5 \le x \le 3.5$, $0 \le y \le 0.5$, $1.5 \le z \le 2.5$, M is at least one of V and Fe, and N is at least one of Co, Ni and Mn).

2. A cathode active material for a lithium secondary battery, wherein the cathode active material has a peak in $2\theta = 12.5 \pm 2°$, $23.5 \pm 2°$, $32.5 \pm 2°$, $34.0 \pm 2°$, $48.5 \pm 2°$ and $58.0 \pm 2°$ in XRD measurement (a CuKα ray), and is represented by $(Na_{1-\alpha}Li_\alpha)_xM_{1-y}N_y(PO_4)_z$ ($0.5 \le \alpha \le 1$, $2.5 \le x \le 3.5$, $0 \le y \le 0.5$, $1.5 \le z \le 2.5$, M is at least one of V and Fe, and N is at least one of Co, Ni and Mn).

3. A lithium secondary battery comprising a cathode active material layer, an anode active material layer, and an electrolyte layer formed between the cathode active material layer and the anode active material layer,
wherein the cathode active material layer contains the cathode active material for a lithium secondary battery according to claim 1.

4. A lithium secondary battery comprising a cathode active material layer, an anode active material layer, and an electrolyte layer formed between the cathode active material layer and the anode active material layer,
wherein the cathode active material layer contains the cathode active material for a lithium secondary battery according to claim 2.

5. A method for producing a cathode active material for a lithium secondary battery comprising steps of:
an Na-type precursor preparing step of preparing an Na-type precursor having an Na element, an M element (M is at least one of V and Fe) and a $PO_4$ structure; and
an ion exchanging step of obtaining a cathode active material for a lithium secondary battery, in which the cathode active material comprises a crystal structure belonging to a space group C12/c1, and is represented by $(Na_{1-\alpha}Li_\alpha)_xM_{1-y}N_y(PO_4)_z$ ($0.5 \le \alpha \le 1$, $2.5 \le x \le 3.5$, $0 \le y \le 0.5$, $1.5 \le z \le 2.5$, M is at least one of V and Fe, and N is at least one of Co, Ni and Mn) by ion-exchanging a Na ion of the Na-type precursor for a Li ion.

6. The method for producing a cathode active material for a lithium secondary battery according to claim 5, wherein the Na-type precursor further having an N element (N is at least one of Co, Ni and Mn) is prepared in the Na-type precursor preparing step.

* * * * *